(12) United States Patent
Sakakura (10) Patent No.: US 9,654,039 B2
(45) Date of Patent: May 16, 2017

(54) PULSE MOTOR DRIVING CIRCUIT AND METHOD OF DRIVING A PULSE MOTOR

(71) Applicant: FUJITSU COMPONENT LIMITED, Tokyo (JP)

(72) Inventor: Taichi Sakakura, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 355 days.

(21) Appl. No.: 14/253,911

(22) Filed: Apr. 16, 2014

(65) Prior Publication Data

US 2014/0312825 A1    Oct. 23, 2014

(30) Foreign Application Priority Data

Apr. 18, 2013 (JP) .................................. 2013-087742

(51) Int. Cl.
*G05B 11/01* (2006.01)
*H02P 8/12* (2006.01)

(52) U.S. Cl.
CPC ..................................... *H02P 8/12* (2013.01)

(58) Field of Classification Search
CPC ...... A63F 2009/2454; A63F 1/02; A63F 1/18; G07F 17/3293; B41J 1/24
See application file for complete search history.

(56) References Cited

U.S. PATENT DOCUMENTS

| | | | | |
|---|---|---|---|---|
| 6,054,825 A * | 4/2000 | Hayner | ..................... | H02P 6/34 318/459 |
| 2003/0214820 A1* | 11/2003 | Nakata | ................ | H02M 3/3385 363/21.01 |
| 2009/0135531 A1* | 5/2009 | Hirata | .................... | H02H 3/093 361/18 |
| 2012/0049829 A1* | 3/2012 | Murakami | .............. | H02M 1/32 323/288 |

FOREIGN PATENT DOCUMENTS

| | | |
|---|---|---|
| JP | 50-032420 | 3/1975 |
| JP | 63-237267 | 10/1988 |
| JP | 06-090596 | 3/1994 |

* cited by examiner

*Primary Examiner* — Shawki S Ismail
*Assistant Examiner* — Zoheb Imtiaz
(74) *Attorney, Agent, or Firm* — IPUSA, PLLC (57) ABSTRACT

A pulse motor driving circuit for driving a pulse motor includes a first switch having a terminal that is connected with a positive terminal of a power source; a second switch having a terminal that is connected with a negative terminal of the power source; and a capacitor having a terminal connected with a limit element and having another terminal connected with another terminal of the first switch and another terminal of the second switch, wherein the limit element is provided between the positive terminal and the capacitor and limits a current, wherein the first switch is turned on and the second switch is turned off in a current application start period while the current starts to be applied, wherein the first switch is turned off and the second switch is turned on in a period other than the current application start period.

8 Claims, 9 Drawing Sheets

| TIME | $A_1$ | $B_1$ | $A_2$ | $B_2$ |
|---|---|---|---|---|
| T1 | 0 | 0 | 1 | 1 |
| T2 | 0 | 0 | 1 | 0 |
| T3 | 0 | 1 | 1 | 0 |
| T4 | 0 | 1 | 0 | 0 |
| T5 | 1 | 1 | 0 | 0 |
| T6 | 1 | 0 | 0 | 0 |
| T7 | 1 | 0 | 0 | 1 |
| T8 | 0 | 0 | 0 | 1 |

NOTE: IN CASE OF ONE-TWO-PHASE EXCITATION

FIG.1

| TIME | $A_1$ | $B_1$ | $A_2$ | $B_2$ |
|---|---|---|---|---|
| T1 | 0 | 0 | 1 | 1 |
| T2 | 0 | 0 | 1 | 0 |
| T3 | 0 | 1 | 1 | 0 |
| T4 | 0 | 1 | 0 | 0 |
| T5 | 1 | 1 | 0 | 0 |
| T6 | 1 | 0 | 0 | 0 |
| T7 | 1 | 0 | 0 | 1 |
| T8 | 0 | 0 | 0 | 1 |

NOTE: IN CASE OF ONE-TWO-PHASE EXCITATION

United States Patent US 9,654,039 B2

PULSE MOTOR DRIVING CIRCUIT AND METHOD OF DRIVING A PULSE MOTOR

CROSS-REFERENCE TO RELATED APPLICATIONS

This patent application is based upon and claims the benefit of priority of Japanese Patent Application No. 2013-087742 filed on Apr. 18, 2013, the entire contents of which are incorporated herein by reference.

BACKGROUND OF THE INVENTION

1. Field of the Invention

The present invention relates to a pulse motor driving circuit and a method of driving a pulse motor.

2. Description of the Related Art

One example of a portable electronic device driven by a battery is an electronic device having a built-in printer. A stepping motor is used in this electronic device in order to carry a recording paper, for example.

However, because the capacity of the battery as a power source is not large enough to prevent a voltage drop at a time of quickly causing a large current to flow when the electronic apparatus is driven by the battery, a rise profile is not properly shaped and therefore a high-speed motion is difficult to obtain in the stepping motor. Therefore, various methods are being studied to enable the high-speed motion in Japanese Laid-open Patent Publication No. 50-32420, Japanese Laid-open Patent Publication No. 63-237267, and Japanese Laid-open Patent Publication No. 6-90596.

SUMMARY OF THE INVENTION

According to an aspect of the present invention, there is provided a pulse motor driving circuit for driving a pulse motor including a first switch having a terminal that is connected with a positive terminal of a power source; a second switch having a terminal that is connected with a negative terminal of the power source; and a capacitor having a terminal that is connected with a limit element and having another terminal that is connected with another terminal of the first switch and another terminal of the second switch, wherein the limit element is provided between the positive terminal of the power source and the capacitor and limits a current flowing from the power source to the capacitor, wherein the first switch is turned on and the second switch is turned off in a current application start period while the current starts to be applied to a pulse motor phase excitation part for exciting the pulse motor, wherein the first switch is turned off and the second switch is turned on in a period other than the current application start period.

DESCRIPTION OF EMBODIMENTS

A description is given below, with reference to the FIG. 1 through FIG. 10B of embodiments of the present invention. Where the same reference symbols are attached to the same parts, repeated description of the parts is omitted.

First Embodiment

Figure 1:
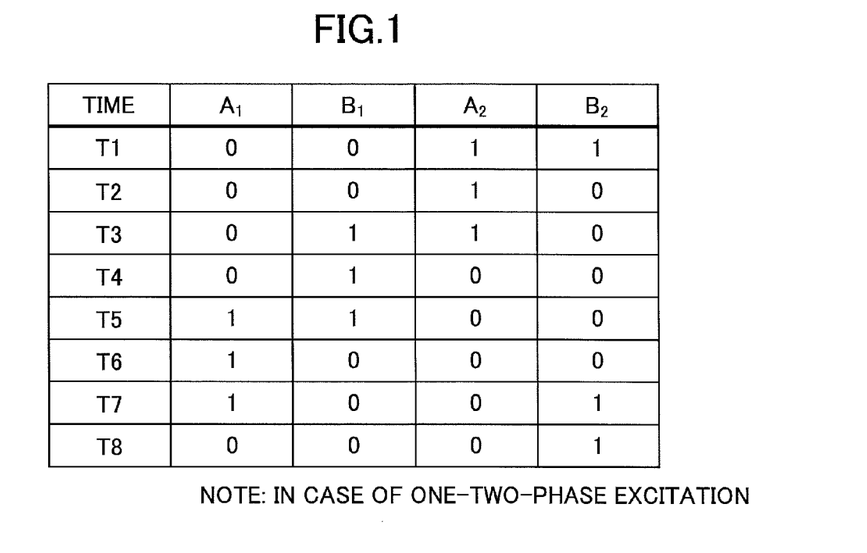
FIG. 1 is a truth table in an one-two-phase excitation.
Figure 2:
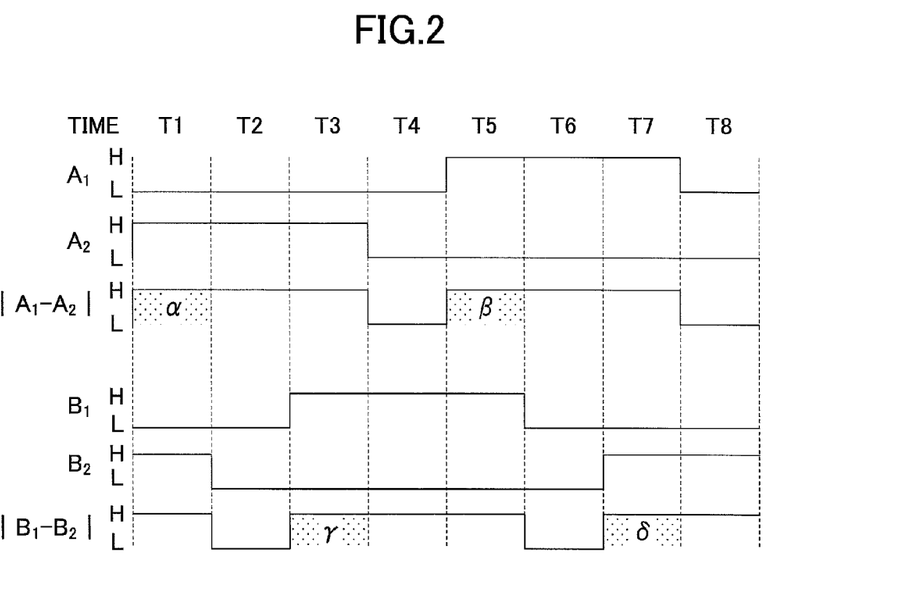
FIG. 2 is a timing chart in an one-two-phase excitation.

At first, the one-two-phase excitation in a stepping motor is described. FIG. 1 illustrates a truth table and FIG. 2 illustrates a timing chart of electric currents corresponding to the truth table in a case of the one-two-phase excitation. When the stepping motor is driven, currents flowing through the coils $A_1$, $A_2$, $B_1$, and $B_2$ are changed in an order of times T1, T2, T3, T4, T5, T6, T7, and T8 illustrated in FIGS. 1 and 2 to rotate the stepping motor. In this stepping motor, a voltage drop occurs at a current rise time when the current rises so as to start to flow through each of the coils $A_1$, $A_2$, $B_1$, and $B_2$ to degrade a rise profile and prevent a fast rotation. Referring to FIG. 2, reference symbols α, β, γ, and δ designate steps of rises where the voltage drops occur. Further, within the embodiment, for example, periods while a voltage is applied to a phase A ($A_1$, $A_2$) of a pulse motor phase excitation part of the stepping motor, namely, times T1, T2, T3, T5, T6, and T7 may be called a current application period. Among such period, rise periods T1 and T5 may be called a current application start period.

[Pulse Motor Driving Circuit]

Figure 3:
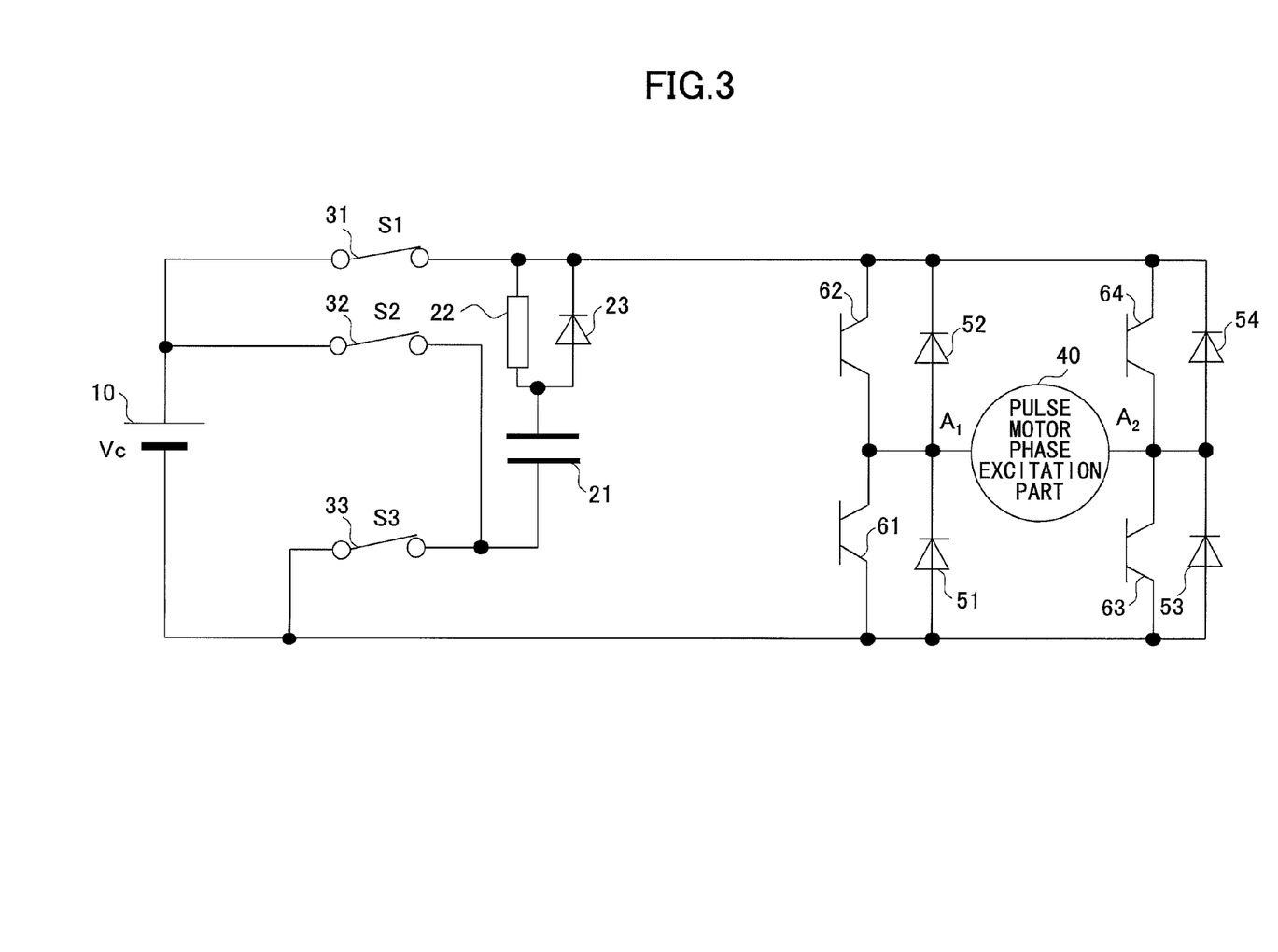
FIG. 3 illustrates a circuit structure of a pulse motor driving circuit of a first embodiment.

Next, a pulse motor driving circuit of a first embodiment is described. FIG. 3 illustrates the circuit of the pulse motor driving circuit of the first embodiment. In FIG. 3, only the phase A ($A_1$, $A_2$) is illustrated and a phase B ($B_1$, $B_2$) is omitted. The pulse motor driving circuit actually includes a pulse motor driving circuit having a structure similar to that in the phase A ($A_1$, $A_2$) is provided in the phase B ($B_1$, $B_2$).

The pulse motor driving circuit includes a power source 10 for supplying a power source voltage, a capacitor 21, a resistor 22, a diode 23, a first switch (S1) 31, a second switch (S2) 32, and a third switch (S3) 33. In the first switch (S1) 31, the second switch (S2) 32, and the third switch (S3) 33 of the embodiment, "ON" means that the switch is closed so as to be turned on and "OFF" means that the switch is opened so as to be turned off.

A diode 51 and a transistor 61 are connected in parallel between the coil $A_1$ of the pulse motor phase excitation part 40 of the pulse motor and a low voltage side of the power source 10. A diode 52 and a transistor 62 are connected in parallel between the coil $A_1$ of the pulse motor phase excitation part 40 of the pulse motor and a high voltage side of the power source 10.

Specifically, one terminal of each of the diode 51 and the transistor 61 is connected with a negative terminal of the power source 10, and another terminal of each of the diode 51 and the transistor 61 is connected with the coil $A_1$ of the pulse motor phase excitation part 40. Further, one terminal of each of the diode 52 and the transistor 62 is connected with the coil $A_1$ of the pulse motor phase excitation part 40, and another terminal of each of the diode 52 and the transistor 62 is connected with a positive terminal of the power source 10. Therefore, the other terminals of the diode 51 and the transistor 61 are connected with one terminal of the diode 52 and one terminal of the transistor 62.

A diode 53 and a transistor 63 are connected in parallel between a coil $A_2$ of the pulse motor phase excitation part 40 of the pulse motor and the low voltage side of the power source 10. A diode 54 and a transistor 64 are connected in parallel between the coil $A_1$ of the pulse motor phase excitation part 40 of the pulse motor and the high voltage side of the power source 10.

Specifically, one terminal of each of the diode 53 and the transistor 63 is connected with the negative terminal of the power source 10, and another terminal of each of the diode 53 and the transistor 63 is connected with the coil $A_2$ of the pulse motor phase excitation part 40. Specifically, one terminal of each of the diode 54 and the transistor 64 is connected with the coil $A_2$ of the pulse motor phase excitation part 40, and another terminal of each of the diode 54 and the transistor 64 is connected with the positive terminal of the power source 10. Therefore, the other terminals of the diode 53 and the transistor 63 are connected with one terminal of the diode 54 and one terminal of the transistor 64.

One terminal of the first switch (S1) 31 and one terminal of the second switch (S2) 32 are connected with the positive terminal of the power source 10. One terminal of the third switch (S3) 33 is connected with the negative terminal of the power source 10.

The resistor 22 and the diode 23 are connected in parallel. Another terminal of the first switch (S1) 31 is connected with one terminal of each of the resistor 22 and the diode 23, and further connected with the other terminal of the diode 52, the other terminal of the transistor 62, the other terminal of the diode 54, and the other terminal of the transistor 64.

Another terminal of each of the resistor 22 and the diode 23 is connected with one terminal of the capacitor 21. Another terminal of the capacitor 21 is connected with another terminal of the second switch (S2) 32 and another terminal of the third switch (S3) 33.

Within the embodiment, the first switch (S1) 31 and the third switch (S2) 33 are interlocked in their operations, and the second switch (S2) 33 is controlled so as to perform an operation reverse to the operations of the first switch (S1) 31 and the third switch (S2) 33.

[Method of Driving the Pulse Motor]

Figure 4A:
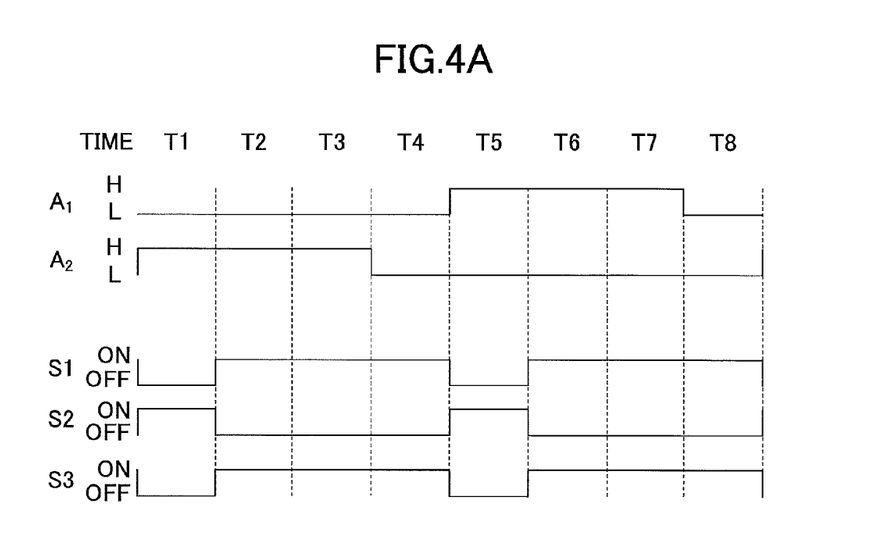
FIG. 4A illustrates a timing chart in a method of driving a pulse motor of the first embodiment.
Figure 4B:
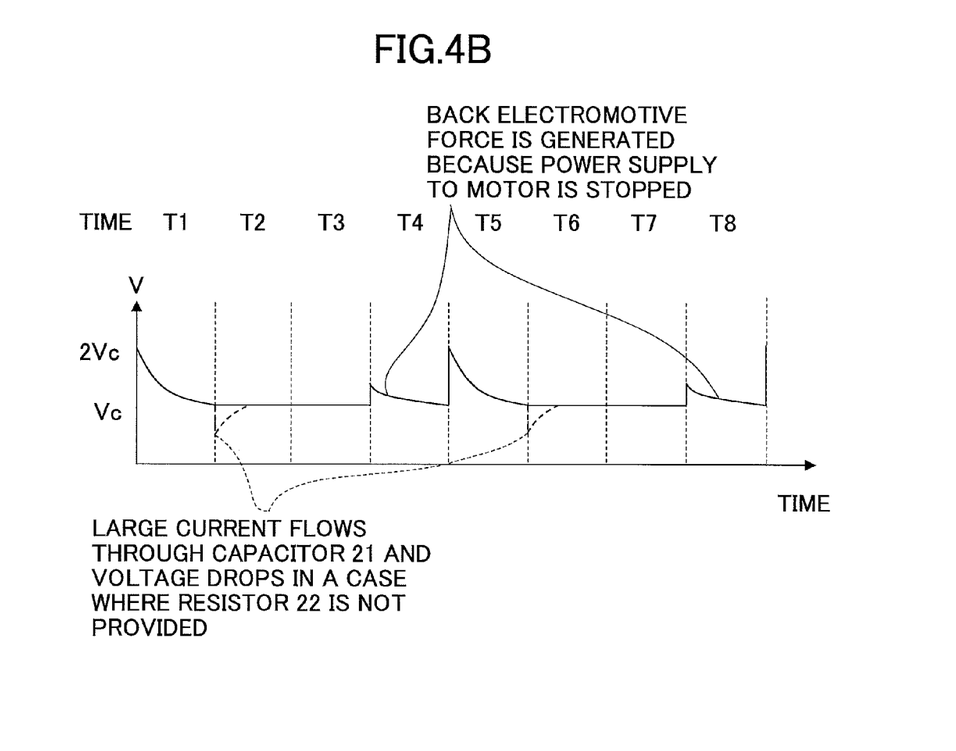
FIG. 4B illustrates another timing chart in the method of driving the pulse motor of the first embodiment.

Next, a method of driving the pulse motor of the first embodiment is described. FIGS. 4A and 4B are timing charts in the method of driving the pulse motor of the first embodiment. Within the first embodiment, when the stepping motor is driven, the currents flowing through the coils $A_1$, $A_2$, $B_1$, and $B_2$ are changed in the order of times T1, T2, T3, T4, T5, T6, T7, and T8 illustrated in FIG. 4A to rotate the stepping motor.

Specifically, at T1, the value of a current applied to the coil $A_1$ of the pulse motor phase excitation part 40 is set to low (L), the value of a current applied to the coil $A_2$ of the pulse motor phase excitation part 40 is set to high (H), the first switch (S1) 31 is turned off, the second switch (S2) 32 is turned on, and the third switch (S3) 33 is turned off. Then, the transistors 61 and 64 are turned on and the transistors 62 and 63 are turned off. With this, as illustrated in FIG. 4B, electric charges stored in the capacitor 21 are superposed on the voltage of the power source 10. Therefore, at an initial stage where the value of a current applied to the coil $A_2$ of the pulse motor phase excitation part 40 is set to H, a voltage of about 2Vc that is about a double of the voltage Vc of the power source 10 is applied to the pulse motor phase excitation part 40. Thereafter, the applied voltage is gradually decreased along with an electric discharge in the capacitor 21. At this time, the current flowing through the pulse motor phase excitation part 40 flows from the capacitor 21 through the diode 23, the transistor 64, the pulse motor phase excitation part 40, and the transistor 61 in this order.

Then, at T2 and T3, the value of the current applied to the coil $A_1$ of the pulse motor phase excitation part 40 is maintained to be L, the value of the current applied to the coil $A_2$ of the pulse motor phase excitation part 40 is maintained to be H, the first switch (S1) 31 is turned on, the second switch (S2) 32 is turned off, and the third switch (S3) 33 is turned on. With this, the voltage Vc in the power source 10 is applied to the pulse motor phase excitation part 40, and simultaneously the capacitor 21 is charged. At this time, the current flowing through the pulse motor phase excitation part 40 flows from the power source 10 through the first switch (S1) 31, the transistor 64, the pulse motor phase excitation part 40, and the transistor 61 in this order and returns to the power source 10. Further, one terminal of the capacitor 21 is connected with the positive electrode of the power source 10 through the resistor 22 and the first switch (S1) 31 and the other terminal of the capacitor 21 is connected with the negative terminal of the power source 10 through the third switch (S3) 33. Therefore, while the current is limited by the resistor 22, the capacitor 21 is charged by the power source 10. If the resistor 22 is not provided, a large current flows through the capacitor 21 as indicated by a dashed line in FIG. 4B to cause a voltage drop and therefore to adversely influence driving of the pulse motor.

At T4, the first switch (S1) 31 is turned on, the second switch (S2) 32 is turned off, the third switch (S3) 33 is turned on, the value of the current applied to the coil $A_1$ of the pulse motor phase excitation part 40 is maintained to be L, and the value of the current applied to the coil $A_2$ of the pulse motor phase excitation part 40 is set to L. At this time, the transistors 61 to 64 are turned off. In the state, because the voltage is not applied to the pulse motor phase excitation part 40, the current is prevented from flowing through the pulse motor phase excitation part 40. However, because the power supply to the pulse motor phase excitation part 40 is stopped, a back electromotive force is generated as illustrated in FIG. 4B. In the state, one terminal of the capacitor 21 is connected with the positive electrode of the power source 10 through the resistor 22 and the first switch (S1) 31 and the other terminal of the capacitor 21 is connected with the negative terminal of the power source 10 through the third switch (S3) 33. Therefore, the capacitor 21 is continuously charged by the power source 10.

At T5, the value of the current applied to the coil $A_1$ of the pulse motor phase excitation part 40 is set to H, the value of the current applied to the coil $A_2$ of the pulse motor phase excitation part 40 is maintained to be L, the first switch (S1) 31 is turned off, the second switch (S2) 32 is turned on, and the third switch (S3) 33 is turned off, At this time, the transistors 62 and 63 are turned on and the transistors 61 and 64 are turned off. With this, as illustrated in FIG. 4B, electric charges stored in the capacitor 21 are superposed on the voltage Vc of the power source 10. Therefore, at an initial stage where the value of the current applied to the coil $A_1$ of the pulse motor phase excitation part 40 is set to H, the voltage of about 2Vc that is about a double of the voltage Vc of the power source 10 is applied to the pulse motor phase excitation part 40. Thereafter, the applied voltage gradually decreases along with an electric discharge in the capacitor 21. At this time, the current flowing through the pulse motor phase excitation part 40 flows from the capacitor 21 through the diode 23, the transistor 62, the pulse motor phase excitation part 40, and the transistor 63 in this order.

At T6 and T7, the value of the current applied to the coil $A_1$ of the pulse motor phase excitation part 40 is maintained to be H, the value of the current applied to the coil $A_2$ of the pulse motor phase excitation part 40 is maintained to be L, the first switch (S1) 31 is turned on, the second switch (S2) 32 is turned off, and the third switch (S3) 33 is turned on. With this, the voltage Vc in the power source 10 is applied to the pulse motor phase excitation part 40, and simultaneously the capacitor 21 is charged. At this time, the current flowing through the pulse motor phase excitation part 40 flows from the power source 10 through the first switch (S1) 31, the transistor 62, the pulse motor phase excitation part 40, and the transistor 63 in this order and returns to the power source 10. Further, one terminal of the capacitor 21 is connected with the positive electrode of the power source 10 through the resistor 22 and the first switch (S1) 31 and the other terminal of the capacitor 21 is connected with the negative terminal of the power source 10 through the third switch (S3) 33. Therefore, while the current is limited by the resistor 22, the capacitor 21 is charged by the power source 10. In a case where the resistor 22 is not provided, a large current flows through the capacitor 21 as indicated by a dashed line in FIG. 4B to cause a voltage drop and therefore to adversely influence driving of the pulse motor.

At T8, the first switch (S1) 31 is turned on, the second switch (S2) 32 is turned off, the third switch (S3) 33 is turned on, the value of the current applied to the coil $A_1$ of the pulse motor phase excitation part 40 is set to L, and the value of the current applied to the coil $A_2$ of the pulse motor phase excitation part 40 is maintained to be L. At this time, the transistors 61 to 64 are turned off. In the state, because the voltage is not applied to the pulse motor phase excitation part 40, the current is prevented from flowing through the pulse motor phase excitation part 40. However, because the power supply to the pulse motor phase excitation part 40 is stopped, a back electromotive force is generated as illustrated in FIG. 4B. In the state, one terminal of the capacitor 21 is connected with the positive electrode of the power source 10 through the resistor 22 and the first switch (S1) 31 and the other terminal of the capacitor 21 is connected with the negative terminal of the power source 10 through the third switch (S3) 33. Therefore, the capacitor 21 is continuously charged by the power source 10.

In the method of driving the pulse motor of the first embodiment, the voltage of about 2Vc that is about a double of the voltage Vc of the power source 10 is applied to the pulse motor phase excitation part 40 at initial stages of T1 and T5 where the values at the coil $A_2$ and $A_1$ of the pulse motor phase excitation part 40 are set to H, respectively. Therefore, the voltage drop does not occur and the current can have a profile of rising preferably so as to enable a fast rotation of the pulse motor.

Figure 5:
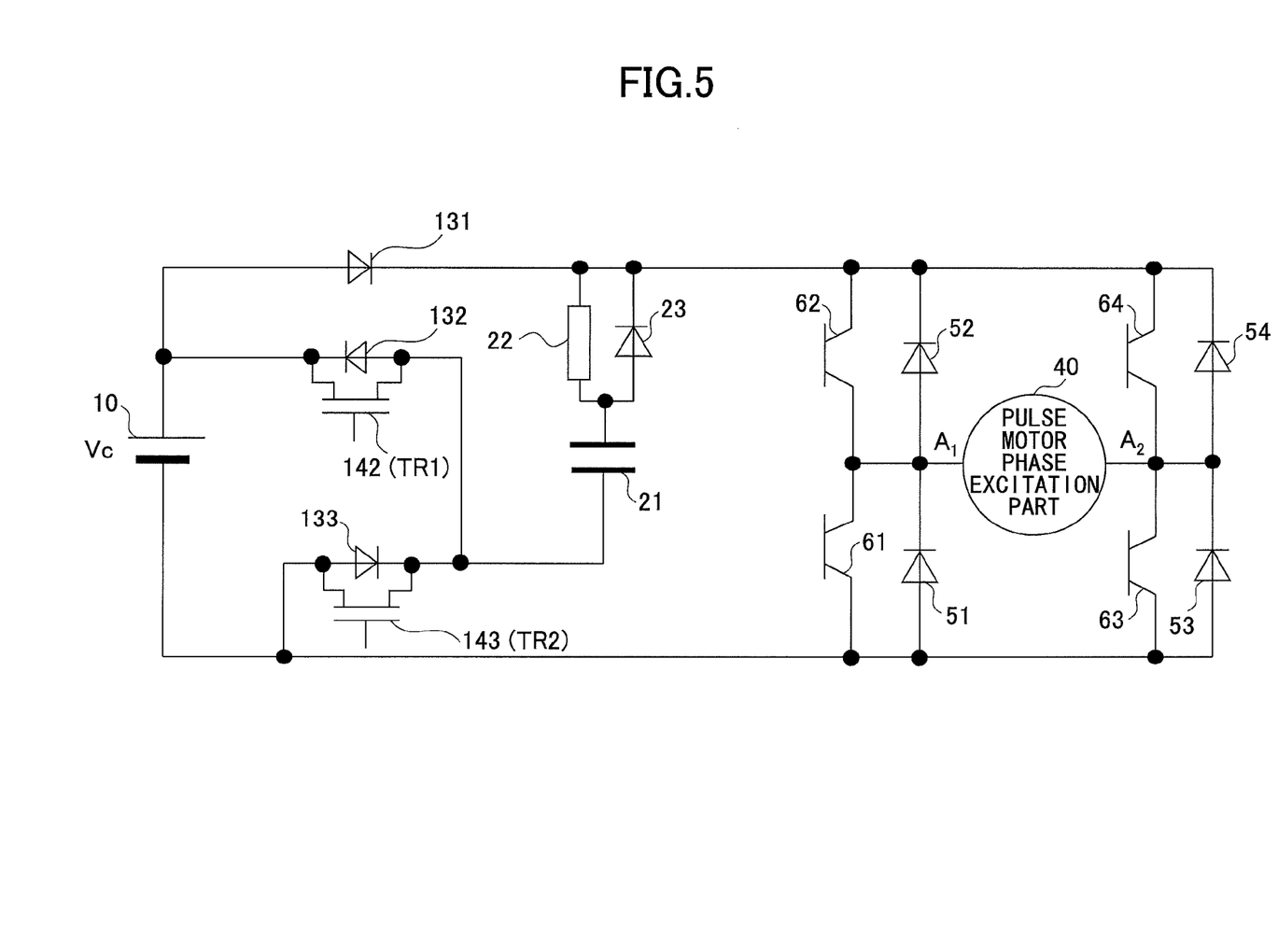
FIG. 5 illustrates another circuit structure of the pulse motor driving circuit of the first embodiment.

Further, in the pulse motor driving circuit of the embodiment illustrated in FIG. 5, a first diode 131 may be used in place of the first switch (S1) 31 so that the first diode 131 is arranged in a forward direction of the power source 10. Further, a first transistor (TR1) 142 may be used in place of the second switch (S2) 32. A second diode 132 may be further provided so as to be connected in parallel to the first transistor (TR1) 142 and in a backward direction relative to the power source 10. Further, a second transistor (TR2) 143 may be used in place of the third switch (S3) 33. A third diode 133 may be further provided so as to be connected in parallel to the second transistor (TR2) 143 and in the backward direction relative to the power source 10. Within the first embodiment, one terminal of each transistor is any one of the source or the drain and another terminal of each transistor is the other one of the source or the drain. Further, the resistor 22 may be referred to as a limit element.

Second Embodiment
[Pulse Motor Driving Circuit]

Figure 6:
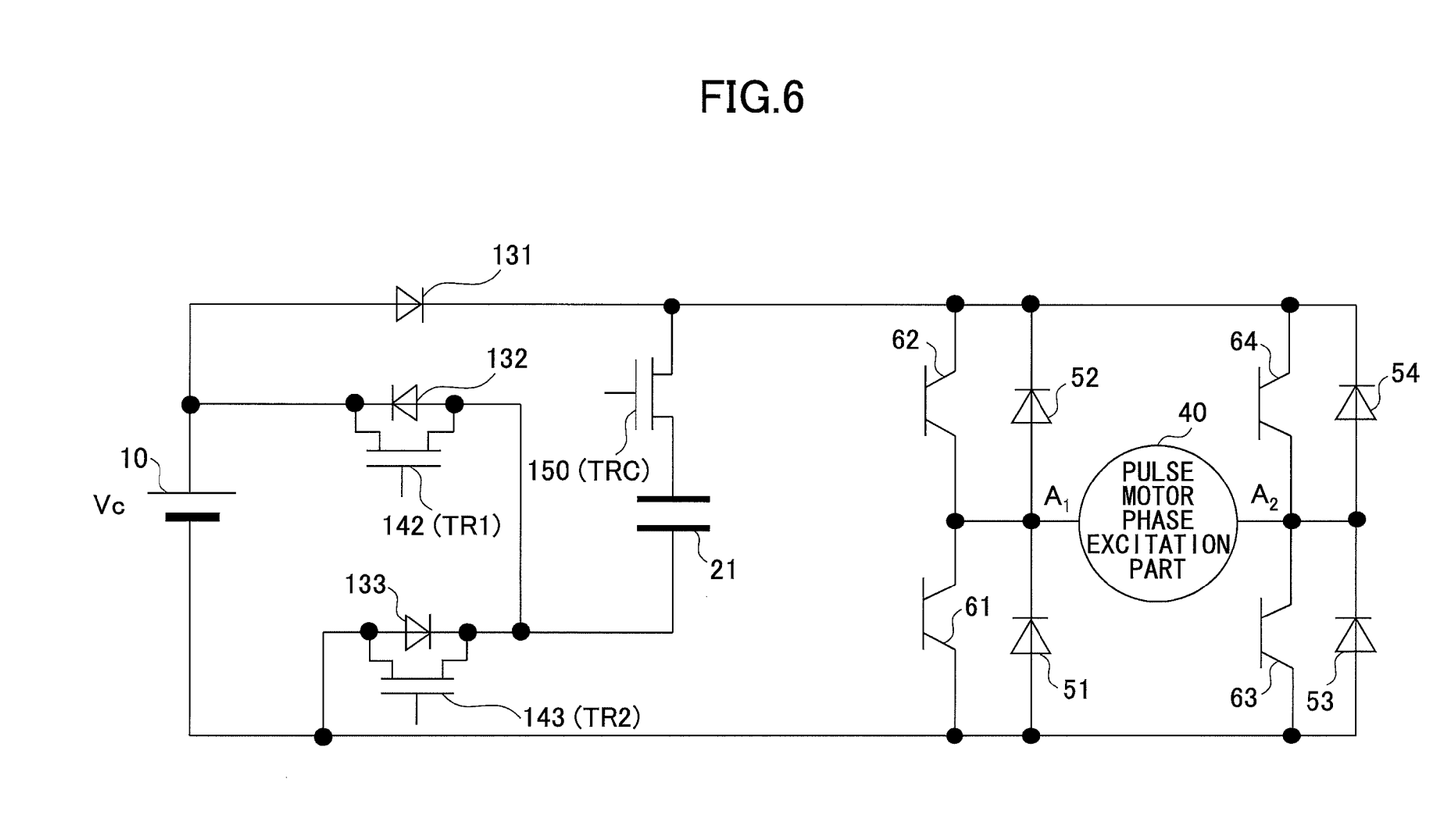
FIG. 6 illustrates a circuit structure of a pulse motor driving circuit of a first embodiment.

Next, a second embodiment is described. As illustrated in FIG. 6, the pulse motor driving circuit of the first embodiment is structured to include a charge and discharge transistor for charging and discharging the capacitor 21 with electricity.

In a manner similar to a case illustrated in FIG. 5, the pulse motor driving circuit of the embodiment uses the first diode 131, the first transistor (TR1) 142, and the second transistor (TR2) 143. The second diode 132 may be arranged in parallel to the first transistor (TR1) 142 and the third diode 133 may be arranged in parallel to the second transistor (TR2) 143.

As illustrated in FIG. 6, the pulse motor driving circuit includes a charge and discharge transistor (TRC) 150. One terminal of the charge and discharge transistor 150 is connected with another terminal of the first diode 131 and further with the other terminal of the diode 52, the other terminal of the transistor 62, the other terminal of the diode 54, and the other terminal of the transistor 64. Another terminal of the charge and discharge transistor 150 is connected with one terminal of the capacitor 21. Within the second embodiment, the charge and discharge transistor 150 may be referred to as a limit element.

[Method of Driving the Pulse Motor]

Figure 7A:
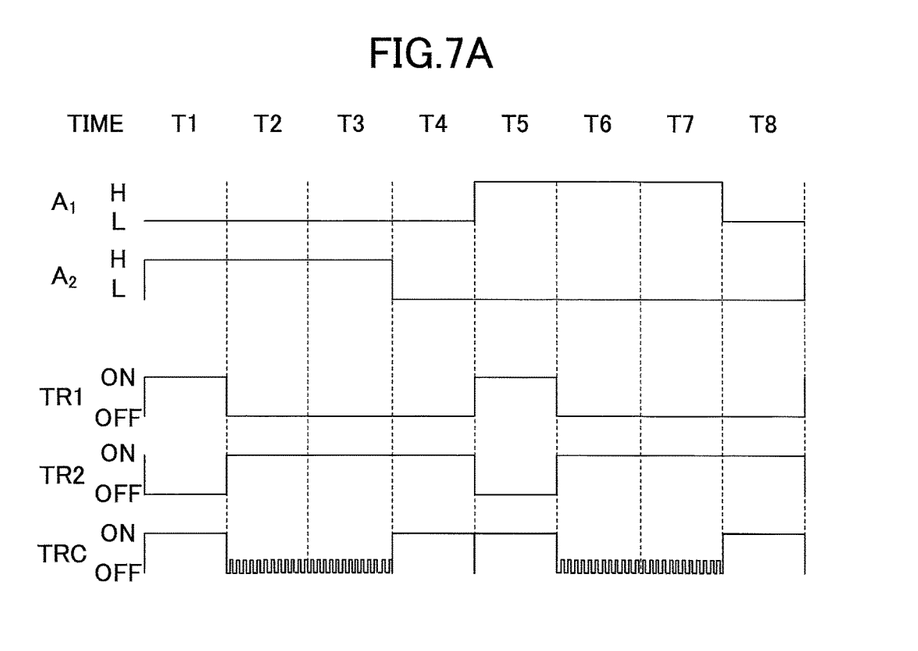
FIG. 7A illustrates a timing chart in a method of driving a pulse motor of a second embodiment.
Figure 7B:
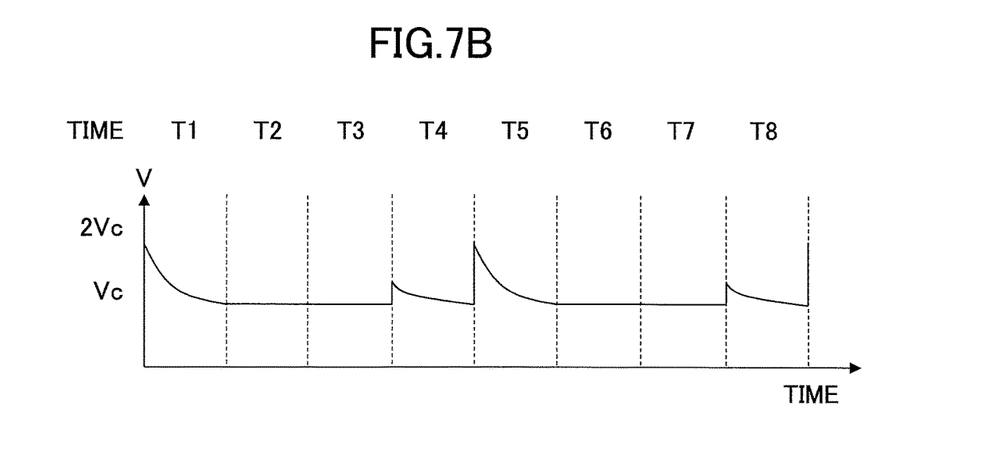
FIG. 7B illustrates another timing chart in the method of driving the pulse motor of the second embodiment.

Next, a method of driving the pulse motor of the second embodiment is described. FIGS. 7A and 7B are timing charts in the method of driving the pulse motor of the second embodiment. Within the first embodiment, when the stepping motor is driven, the currents flowing through the coils $A_1$, $A_2$, or the like are changed in the order of times T1, T2, T3, T4, T5, T6, T7, and T8 illustrated in FIG. 7A to thereby rotate the stepping motor.

At T1, the value in the coil $A_1$ of the pulse motor phase excitation part 40 is set to L, the value in the coil $A_2$ of the pulse motor phase excitation part 40 is set to H, the first transistor (TR1) 142 is turned on, the second transistor (TR2) 143 is turned off, and the charge and discharge transistor (TRC) 150 is turned on. With this, as illustrated in FIG. 7B, electric charges stored in the capacitor 21 are superposed on the voltage Vc of the power source 10. Therefore, at an initial stage where the value of the current applied to the coil $A_2$ of the pulse motor phase excitation part 40 is set to H, the voltage of about 2Vc that is about the double of the voltage Vc of the power source 10 is applied to the pulse motor phase excitation part 40. Thereafter, the applied voltage gradually decreases along with an electric discharge in the capacitor 21. At this time, the current flowing through the pulse motor phase excitation part 40 flows from the capacitor 21 through the charge and discharge transistor (TRC) 150, the transistor 64, the pulse motor phase excitation part 40, and the transistor 61 in this order.

At the times T2 and T3, the value in the coil $A_1$ of the pulse motor phase excitation part 40 is maintained to be L, the value in the coil $A_2$ of the pulse motor phase excitation part 40 is maintained to be H, the first transistor (TR1) 142 is turned off, the second transistor (TR2) 143 is turned on. Further, a copper control is performed in the charge and discharge transistor (TRC) 150. With this, the voltage Vc in the power source 10 is applied to the pulse motor phase excitation part 40, and simultaneously the capacitor 21 is charged. At this time, the current flowing through the pulse motor phase excitation part 40 flows from the power source 10 through the first switch (S1) 31, the transistor 64, the pulse motor phase excitation part 40, and the transistor 61 in this order and returns to the power source 10. Further, one terminal of the capacitor 21 is connected with the positive electrode of the power source 10 through the charge and discharge transistor (TRC) 150 and the first diode 131, and the other terminal of the capacitor 21 is connected with the negative terminal of the power source 10 through the second transistor (TR2) 143. Therefore, in the charge and discharge transistor (TRC) 150, the power source 10 charges the capacitor 21 while the current is limited by the chopper control in the charge and discharge transistor (TRC) 150.

At the time T4, the value in the coil $A_1$ of the pulse motor phase excitation part 40 is maintained to be L and the value in the coil $A_2$ of the pulse motor phase excitation part 40 is set to L while the first transistor (TR1) 142 is turned off and the second transistor (TR2) 143 is turned on, and the charge and discharge transistor (TRC) 150 is turned on. In the state, because the voltage is not applied to the pulse motor phase excitation part 40, the current is prevented from flowing through the pulse motor phase excitation part 40. However, because the power supply to the pulse motor phase excitation part 40 is stopped, a back electromotive force is generated as illustrated in FIG. 7B. Under this state, one terminal of the capacitor 21 is connected with the positive electrode of the power source 10 through the charge and discharge transistor (TRC) 150 and the first diode 131 and the other terminal of the capacitor 21 is connected with the negative terminal of the power source 10 through the second transistor (TR2) 143. Therefore, the capacitor 21 is continuously charged by the power source 10.

At the time T1, the value in the coil $A_1$ of the pulse motor phase excitation part 40 is set to H, the value in the coil $A_2$ of the pulse motor phase excitation part 40 is maintained to be L, the first transistor (TR1) 142 is turned on, the second transistor (TR2) 143 is turned off, and the charge and discharge transistor (TRC) 150 is turned on. With this, as illustrated in FIG. 7B, electric charges stored in the capacitor 21 are superposed on the voltage Vc of the power source 10. Therefore, at an initial stage where the value of the current applied to the coil $A_1$ of the pulse motor phase excitation part 40 is set to H, the voltage of about 2Vc that is about the double of the voltage Vc of the power source 10 is applied to the pulse motor phase excitation part 40. Thereafter, the applied voltage gradually decreases along with an electric discharge in the capacitor 21. At this time, the current flowing through the pulse motor phase excitation part 40 flows from the capacitor 21 through the charge and discharge transistor (TRC) 150, the transistor 62, the pulse motor phase excitation part 40, and the transistor 63 in this order.

At the times T6 and T7, the value in the coil $A_1$ of the pulse motor phase excitation part 40 is maintained to be H, the value in the coil $A_2$ of the pulse motor phase excitation part 40 is maintained to be L, the first transistor (TR1) 142 is turned off, and the second transistor (TR2) 143 is turned on. Further, the copper control is performed in the charge and discharge transistor (TRC) 150. With this, the voltage Vc in the power source 10 is applied to the pulse motor phase excitation part 40, and simultaneously the capacitor 21 is charged. At this time, the current flowing through the pulse motor phase excitation part 40 flows from the power source 10 through the first diode 131, the transistor 62, the pulse motor phase excitation part 40, and the transistor 63 in this order and returns to the power source 10. Further, one terminal of the capacitor 21 is connected with the positive electrode of the power source 10 through the charge and discharge transistor (TRC) 150 and the first diode 131, and the other terminal of the capacitor 21 is connected with the negative terminal of the power source 10 through the second transistor (TR2) 143. Therefore, in the charge and discharge transistor (TRC) 150, the power source 10 charges the capacitor 21 while the current is limited by the chopper control in the charge and discharge transistor (TRC) 150.

At the time T8, the value in the coil $A_1$ of the pulse motor phase excitation part 40 is set to L and the value in the coil $A_2$ of the pulse motor phase excitation part 40 is maintained to be L while the first transistor (TR1) 142 is turned off and the second transistor (TR2) 143 is turned on, and the charge and discharge transistor (TRC) 150 is turned on. In the state, because the voltage is not applied to the pulse motor phase excitation part 40, the current is prevented from flowing through the pulse motor phase excitation part 40. However, because the power supply to the pulse motor phase excitation part 40 is stopped, a back electromotive force is generated as illustrated in FIG. 7B. Under this state, one terminal of the capacitor 21 is connected with the positive electrode of the power source 10 through the charge and discharge transistor (TRC) 150 and the first diode 131, and the other terminal of the capacitor 21 is connected with the negative terminal of the power source 10 through the second transistor (TR2) 143. Therefore, the capacitor 21 is continuously charged by the power source 10.

Figure 8:
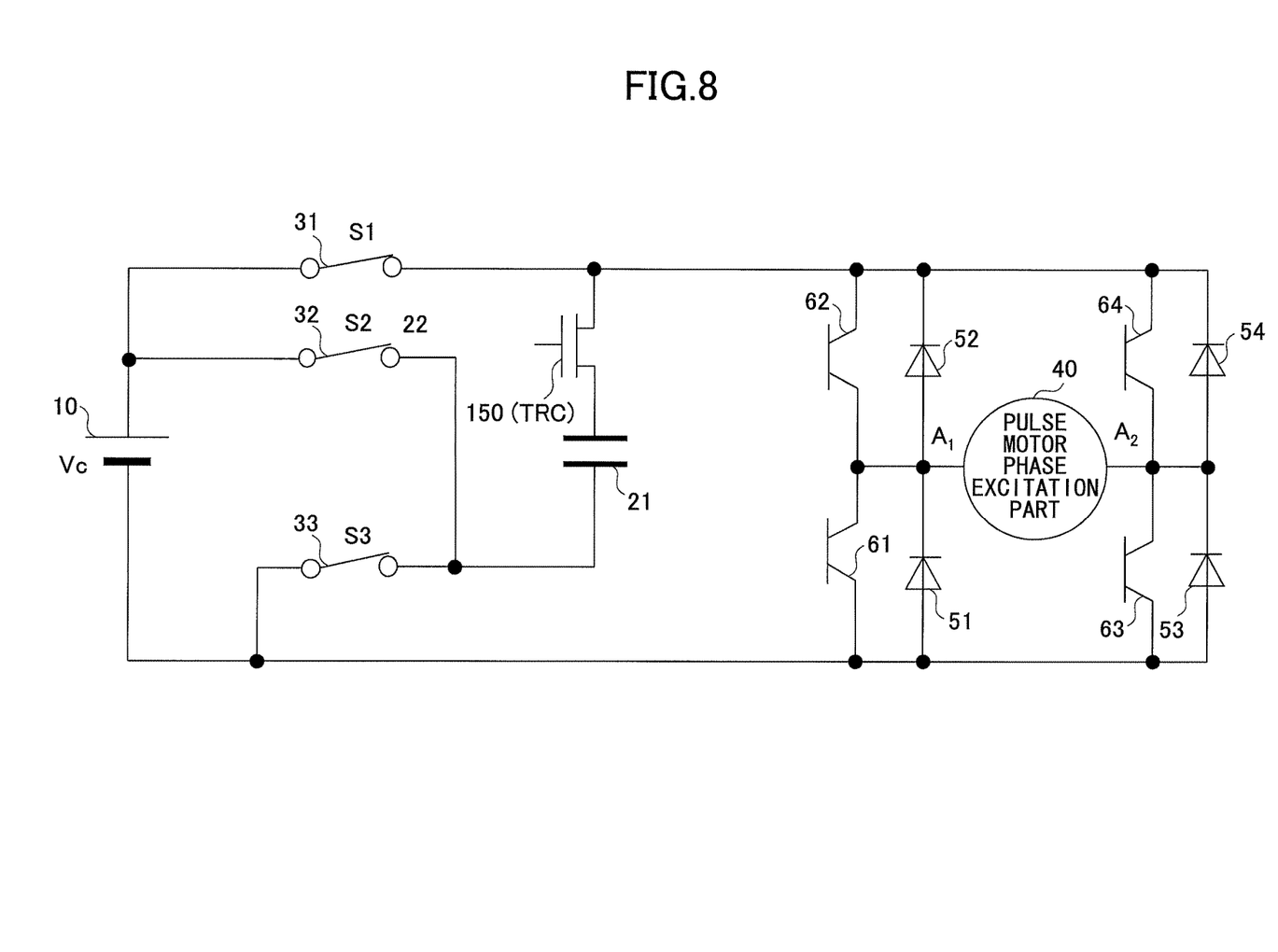
FIG. 8 illustrates another circuit structure of the pulse motor driving circuit of the second embodiment.

As illustrated in FIG. 8, the pulse motor driving circuit of the second embodiment may use the first switch (S1) 31 in place of the first diode 131, the second switch (S2) 32 in place of the first transistor (TR1) 142, the third switch (S3) 33 in place of the second transistor (TR2) 143 in a manner similar to FIG. 8. The other portions of the second embodiment are similar to those described in the first embodiment.

Third Embodiment

[Pulse Motor Driving Circuit]

Figure 9:
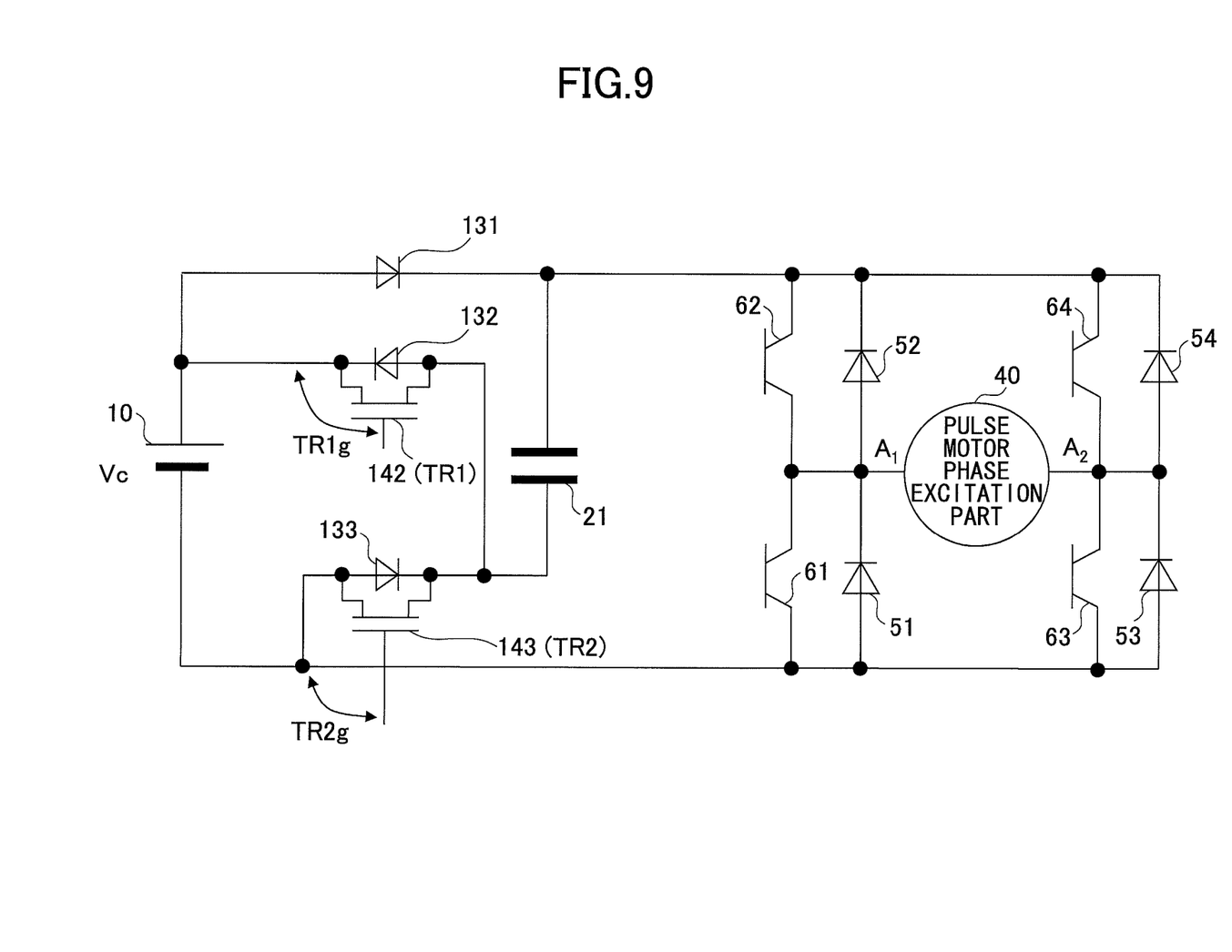
FIG. 9 illustrates a circuit structure of a pulse motor driving circuit of a third embodiment.

A third embodiment is described next. As illustrated in FIG. 9, the pulse motor driving circuit of the third embodiment has a structure without the charge and discharge transistor 150 in the pulse motor driving circuit of the second embodiment. One terminal of the capacitor 21 is connected with another terminal of the first diode 131 and further with the other terminal of the diode 52, the other terminal of the transistor 62, the other terminal of the diode 54, and the other terminal of the transistor 64.

Within the third embodiment, the amount of current flowing from the power source 10 is controlled at a time of charging the capacitor 21 by controlling the gate voltage in the second transistor (TR2) 143.

[Method of Driving the Pulse Motor]

Figure 10A:
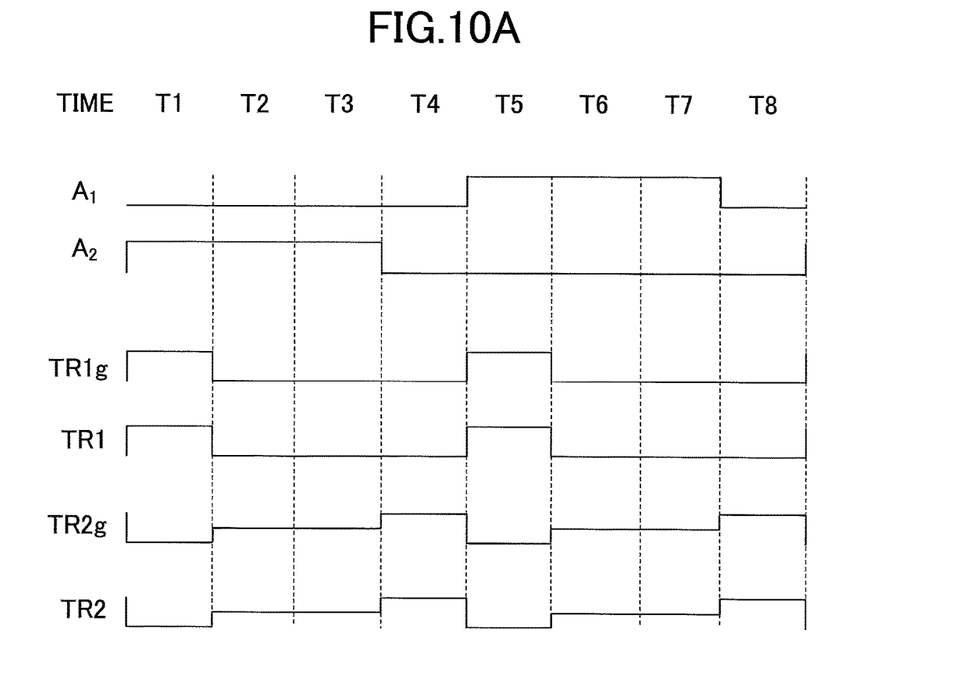
FIG. 10A illustrates a timing chart in a method of driving a pulse motor of a third embodiment.
Figure 10B:
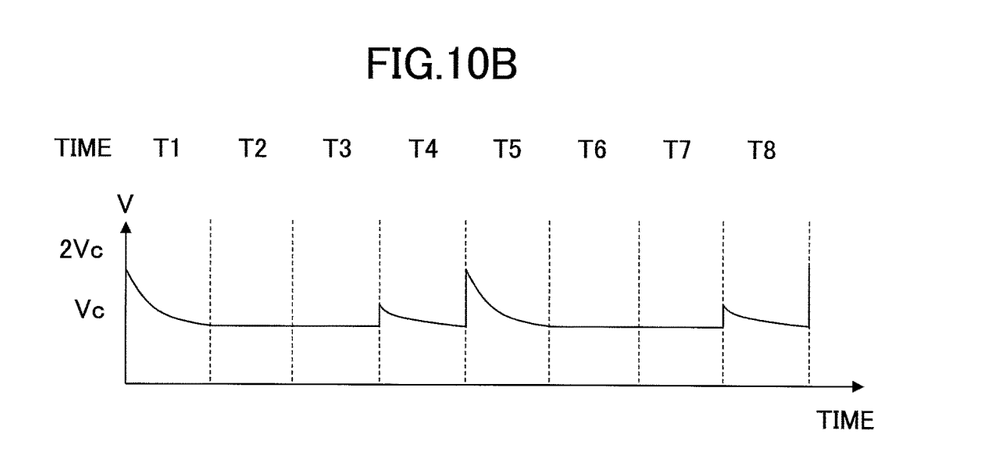
FIG. 10B illustrates another timing chart in the method of driving the pulse motor of the third embodiment.

Next, a method of driving the pulse motor of the third embodiment is described. FIGS. 10A and 10B are timing charts in the method of driving the pulse motor of the third embodiment. Within the third embodiment, when the stepping motor is driven, the currents flowing through the coils $A_1$, $A_2$, or the like are changed in the order of times T1, T2, T3, T4, T5, T6, T7, and T8 illustrated in FIG. 10A to thereby rotate the stepping motor. Referring to FIG. 10A, a gate voltage TR1g is obtained at the gate of the first transistor (TR1) 142, and a gate voltage TR2g is obtained at the gate of the second transistor (TR2) 143.

Specifically, at the time T1, the value in the coil $A_1$ of the pulse motor phase excitation part 40 is set to L, the value in the coil $A_2$ of the pulse motor phase excitation part 40 is set to H, the first transistor (TR1) 142 is turned on, and the second transistor (TR2) 143 is turned off. At this time, the gate voltage TR1g of the first transistor (TR1) 142 is set to cause the first transistor (TR1) 142 to be turned on, and the gate voltage TR2g of the second transistor (TR2) 143 is set to 0 V that causes the second transistor (TR2) 142 to be turned off. With this, as illustrated in FIG. 10B, electric charges stored in the capacitor 21 are superposed on the voltage Vc of the power source 10. Therefore, at an initial stage where the value of the current applied to the coil $A_2$ of the pulse motor phase excitation part 40 is set to H, the voltage of about 2Vc, which is about double the voltage Vc of the power source 10 is applied to the pulse motor phase excitation part 40. Thereafter, the applied voltage gradually decreases along with an electric discharge in the capacitor 21. At this time, the current flowing through the pulse motor phase excitation part 40 flows from the capacitor 21 through the transistor 64, the pulse motor phase excitation part 40, and the transistor 61 in this order.

At the times T2 and T3, the value in the coil $A_1$ of the pulse motor phase excitation part 40 is maintained to be L, the value in the coil $A_2$ of the pulse motor phase excitation part 40 is maintained to be H, the first transistor (TR1) 142 is turned off, and the second transistor (TR2) 143 is applied with the gate voltage lower than that causing the second transistor (TR2) 143 to be turned on. Specifically, the gate voltage TR1g of the first transistor (TR1) 142 is set to 0 V that causes the first transistor (TR1) 142 to be turned off. Further, the gate voltage TR2g of the second transistor (TR2) 143 is set to cause a predetermined amount of current to flow at a time of charging the capacitor 21. This gate voltage TR2g is lower than the gate voltage where the second transistor (TR2) 143 is turned on. With this, the voltage Vc in the power source 10 is applied to the pulse motor phase excitation part 40, and simultaneously the capacitor 21 is charged. At this time, the current flowing through the pulse motor phase excitation part 40 flows from the power source 10 through the first diode 131, the transistor 64, the pulse motor phase excitation part 40, and the transistor 61 in this order and returns to the power source 10. Further, one terminal of the capacitor 21 is connected with the positive electrode of the power source 10 through the first diode 131, and the other terminal of the capacitor 21 is connected with the negative terminal of the power source 10 through the second transistor (TR2) 143. Therefore, while the current is limited by the second transistor (TR2) 143, the capacitor 21 is charged by the power source 10.

At the time T4, the value in the coil $A_1$ of the pulse motor phase excitation part 40 is maintained to be L and the value in the coil $A_2$ of the pulse motor phase excitation part 40 is maintained to be L while the first transistor (TR1) 142 is turned off and the second transistor (TR2) 143 is turned on. Specifically, the gate voltage TR1g of the first transistor (TR1) 142 is maintained to be 0 V that causes the first transistor (TR1) 142 to be turned off. The gate voltage TR2g of the second transistor (TR2) 143 is set to cause the second transistor (TR2) 143 to be turned off. In the state, because the voltage is not applied to the pulse motor phase excitation part 40, the current is prevented from flowing through the pulse motor phase excitation part 40. However, because the power supply to the pulse motor phase excitation part 40 is stopped, a back electromotive force is generated as illustrated in FIG. 10B. Further, one terminal of the capacitor 21 is connected with the positive electrode of the power source 10 through the first diode 131, and the other terminal of the capacitor 21 is connected with the negative terminal of the power source 10 through the second transistor (TR2) 143. Therefore, the capacitor 21 is continuously charged by the power source 10.

Specifically, at the time T5, the value in the coil $A_1$ of the pulse motor phase excitation part 40 is set to H, the value in the coil $A_2$ of the pulse motor phase excitation part 40 is maintained to be H, the first transistor (TR1) 142 is turned on, and the second transistor (TR2) 143 is turned off. The gate voltage TR1g of the first transistor (TR1) 142 is set to cause the first transistor (TR1) 142 to be turned on. The gate voltage TR2g of the second transistor (TR2) 143 is set to 0 V that causes the second transistor (TR2) 143 to be turned off. With this, as illustrated in FIG. 10B, electric charges stored in the capacitor 21 are superposed on the voltage Vc of the power source 10. Therefore, at an initial stage where the value of the current applied to the coil $A_1$ of the pulse motor phase excitation part 40 is set to H, the voltage of about 2Vc that is about the double of the voltage Vc of the power source 10 is applied to the pulse motor phase excitation part 40. Thereafter, the applied voltage gradually decreases along with an electric discharge in the capacitor 21. At this time, the current flowing through the pulse motor phase excitation part 40 flows from the capacitor 21 through the transistor 62, the pulse motor phase excitation part 40, and the transistor 63 in this order.

At the times T6 and T7, the value in the coil $A_1$ of the pulse motor phase excitation part 40 is maintained to be H, the value in the coil $A_2$ of the pulse motor phase excitation part 40 is maintained to be L, the first transistor (TR1) 142 is turned off, and the second transistor (TR2) 143 is set to be applied with a low gate voltage. Specifically, the gate voltage TR1g of the first transistor (TR1) 142 is set to 0 V that causes the first transistor (TR1) to be turned off. The gate voltage TR2g of the second transistor (TR2) 143 is set to cause a predetermined amount of current to flow at a time of charging the capacitor 21. This gate voltage TR2g is lower than the gate voltage where the second transistor (TR2) 143 is turned on. With this, the voltage Vc in the power source 10 is applied to the pulse motor phase excitation part 40, and simultaneously the capacitor 21 is charged. At this time, the current flowing through the pulse motor phase excitation part 40 flows from the power source 10 through the first diode 131, the transistor 62, the pulse motor phase excitation part 40, and the transistor 63 in this order and returns to the power source 10. Further, one terminal of the capacitor 21 is connected with the positive electrode of the power source 10 through the first diode 131, and the other terminal of the capacitor 21 is connected with the negative terminal of the power source 10 through the second transistor (TR2) 143. Therefore, while the current is limited by the second transistor (TR2) 143, the capacitor 21 is charged by the power source 10.

At the time T8, the value in the coil $A_1$ of the pulse motor phase excitation part 40 is maintained to be L and the value in the coil $A_2$ of the pulse motor phase excitation part 40 is maintained to be L while the first transistor (TR1) 142 is turned off and the second transistor (TR2) 143 is turned on. Specifically, the gate voltage TR1g of the first transistor (TR1) 142 is maintained to be 0 V that causes the first transistor (TR1) 142 to be turned off. The gate voltage TR2g of the second transistor (TR2) 143 is set to cause the second transistor (TR2) 143 to be turned on. In the state, because the voltage is not applied to the pulse motor phase excitation part 40, the current is prevented from flowing through the pulse motor phase excitation part 40. However, because the power supply to the pulse motor phase excitation part 40 is stopped, a back electromotive force is generated as illustrated in FIG. 10B. Further, one terminal of the capacitor 21 is connected with the positive electrode of the power source 10 through the first diode 131, and the other terminal of the capacitor 21 is connected with the negative terminal of the power source 10 through the second transistor (TR2) 143. Therefore, the capacitor 21 is continuously charged by the power source 10.

The other portions of the third embodiment are similar to those described in the first and second embodiments.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the pulse motor driving circuit has been described in detail, it should be understood that the various changes, substitutions, and alterations could be made hereto without departing from the spirit and scope of the invention.

What is claimed is:

1. A pulse motor driving circuit for driving a pulse motor, the pulse motor driving circuit comprising:
   a first switch having a terminal that is connected with a positive terminal of a power source;
   a second switch having a terminal that is connected with a negative terminal of the power source; and
   a capacitor having a terminal that is connected with a limit element and having another terminal that is connected with another terminal of the first switch and another terminal of the second switch,
   wherein the limit element is provided between the positive terminal of the power source and the capacitor and limits a current flowing from the power source to the capacitor,
   wherein the first switch is turned on and the second switch is turned off in a current application start period while the current starts to be applied to a pulse motor phase excitation part for exciting the pulse motor,
   wherein the first switch is turned off and the second switch is turned on in a period other than the current application start period.

2. A method of driving a pulse motor by supplying a voltage to a pulse motor phase excitation part of the pulse motor, the method comprising:
   supplying a superposed voltage that is obtained by superposing a capacitor voltage on the power source voltage to the pulse motor phase excitation part by electrically discharging electric charges stored in a capacitor in a current application start period while a current starts to be applied to the pulse motor phase excitation part for exciting the pulse motor;
   supplying the pulse motor phase excitation part with the power source voltage and charging the capacitor with the power source in a first period that is included in the current application period while the current is applied to the pulse motor phase excitation part and is other than the current application start period; and
   charging the capacitor with the power source without supplying the pulse motor phase excitation part with the voltage in a second period that is included in an entire period and is other than the current application period.

3. A pulse motor driving circuit for driving a pulse motor, the pulse motor driving circuit comprising:
   a first switch that is connected with a positive terminal of a power source;
   a second switch that is connected with a negative terminal of the power source;
   a capacitor that is connected between a positive terminal of the power source and both of the first switch and the second switch; and
   a limit element provided at a position between one of the positive terminal or the negative terminal of the power source and the capacitor, and that limits a current flowing from the power source to the capacitor;
   wherein the first switch is turned on and the second switch is turned off in a current application start period while the current starts to be applied to a pulse motor phase excitation part for exciting the pulse motor, and
   wherein the first switch is turned off and the second switch is turned on in a period other than the current application start period.

4. The pulse motor driving circuit for driving a pulse motor according to claim 1, the pulse motor driving circuit further comprising:
   a third switch that is connected between the positive terminal of the power source and the pulse motor,
   wherein the third switch is interlocked with the second switch.

5. The pulse motor driving circuit for driving a pulse motor according to claim 1, wherein the limit element includes a resistor.

6. The pulse motor driving circuit for driving a pulse motor according to claim 1, wherein the limit element includes a charge and discharge transistor.

7. The pulse motor driving circuit for driving a pulse motor according to claim 1, wherein the first switch includes a first transistor, and the second switch includes a second transistor.

8. The pulse motor driving circuit for driving a pulse motor according to claim 1, further comprising:
   a first diode connected between the positive terminal of the power source and the capacitor so that the current flows from the power source to the capacitor through the diode.

* * * * *